United States Patent

[11] 3,589,617

| [72] | Inventor | Arthur P. Adamson<br>Cincinnati, Ohio |
|---|---|---|
| [21] | Appl. No. | 15,927 |
| [22] | Filed | Mar. 2, 1970 |
| [45] | Patented | June 29, 1971 |
| [73] | Assignee | General Electric Company<br>Continuation of application Ser. No.<br>780,327, Dec. 2, 1968, now abandoned. |

[54] EXHAUST-GAS-FLOW-DIVERTING APPARATUS FOR A JET ENGINE
18 Claims, 8 Drawing Figs.

[52] U.S. Cl. ................................................. 239/265.31
[51] Int. Cl. .................................................. B64c 15/04
[50] Field of Search ..................................... 239/265.11 –
265.43; 60/228

[56] References Cited
UNITED STATES PATENTS

| 2,803,944 | 8/1957 | Kroon | 239/265.19 |
| 3,241,771 | 3/1966 | Erwin | 239/265.25 |
| 3,302,404 | 2/1967 | Gist Jr | 239/265.19 |
| 3,531,049 | 9/1970 | Hom | 239/265.13 (X) |

FOREIGN PATENTS

| 21,627 | 7/1957 | Germany | 239/265.19 |

Primary Examiner—Lloyd L. King
Assistant Examiner—Gene A. Church
Attorneys—Derek P. Lawrence, Erwin F. Berrier, Jr., Lee H. Sachs, Frank L. Neuhauser, Oscar B. Waddell and Joseph B. Forman ABSTRACT: A thrust-reversing or thrust-spoiling apparatus for a jet engine is provided having flow-diverting cascades which are movable between a position, wherein each cascade is housed in substantially noninterfering relationship to the flow of exhaust gases, and a position downstream of the exhaust gas outlet wherein the cascades are operative to divert and thereby either spoil or reverse the thrust normally produced thereby.

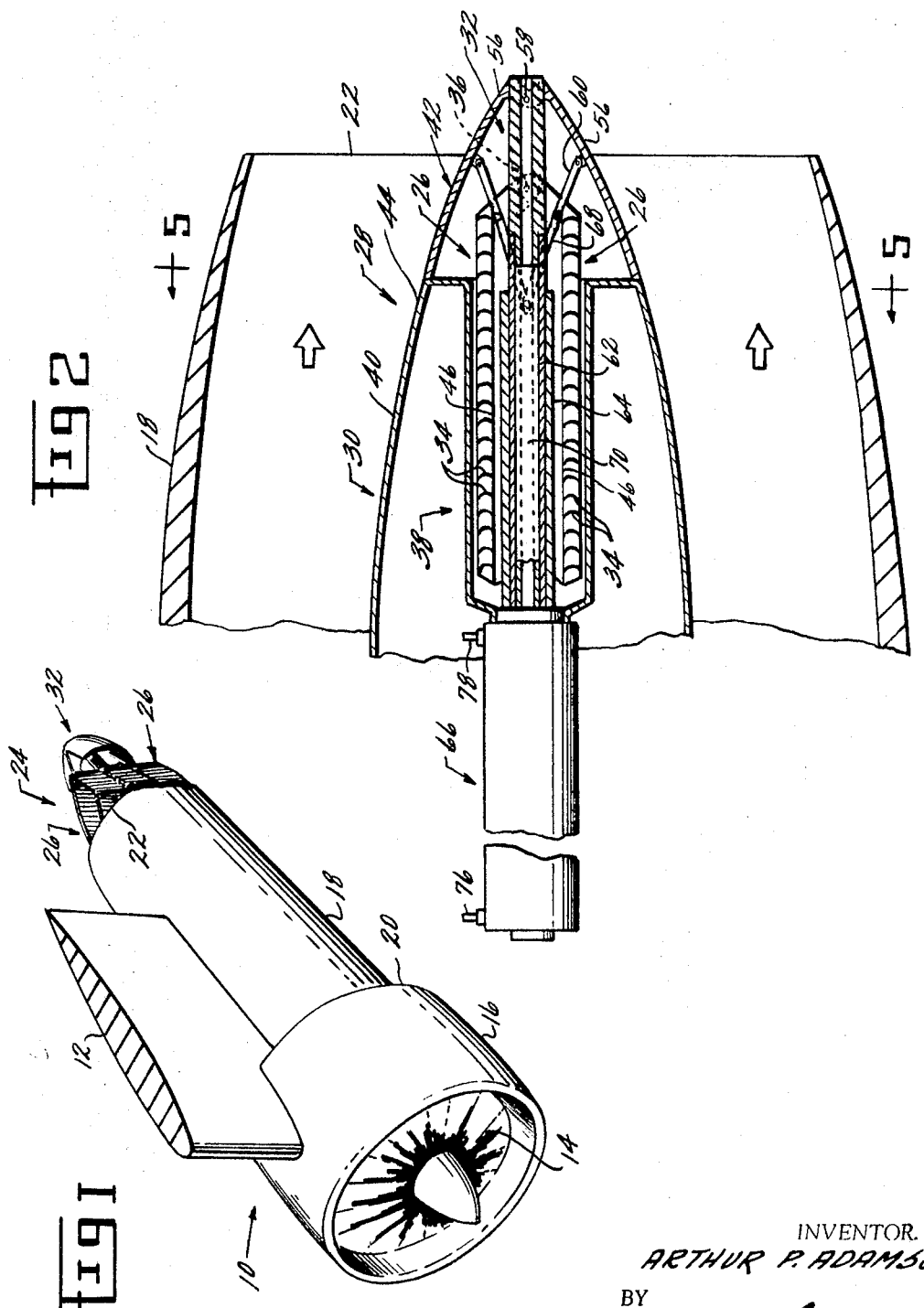

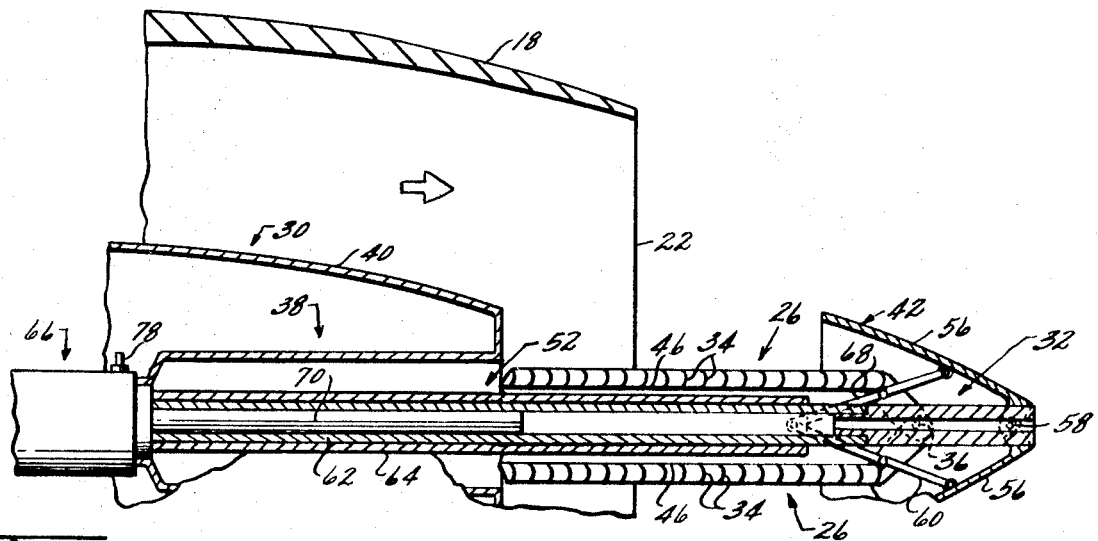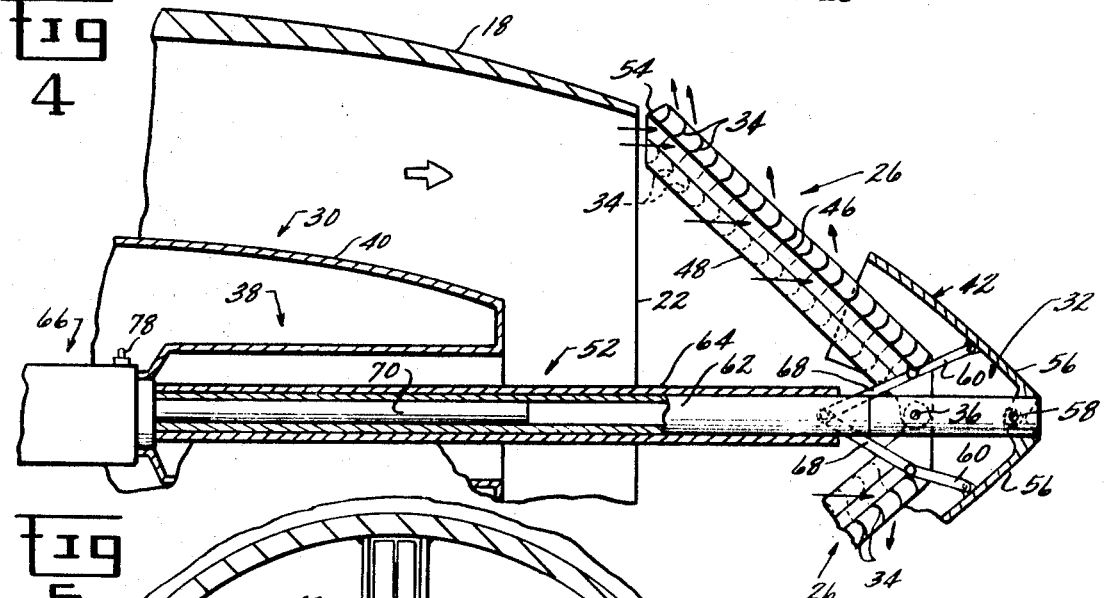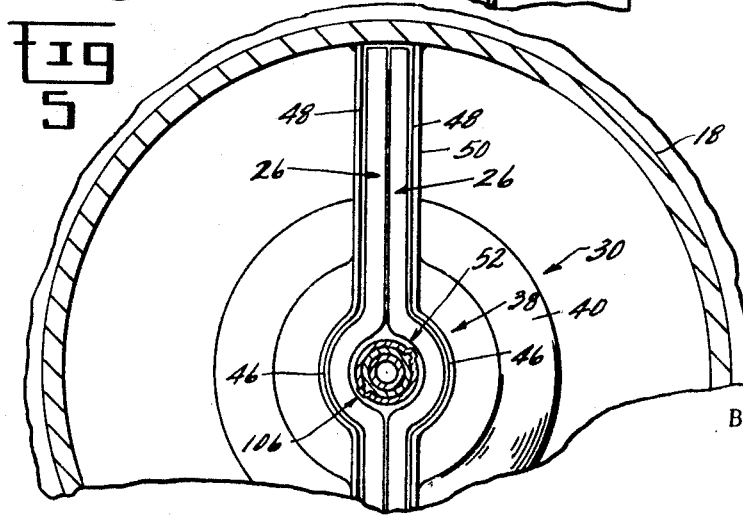

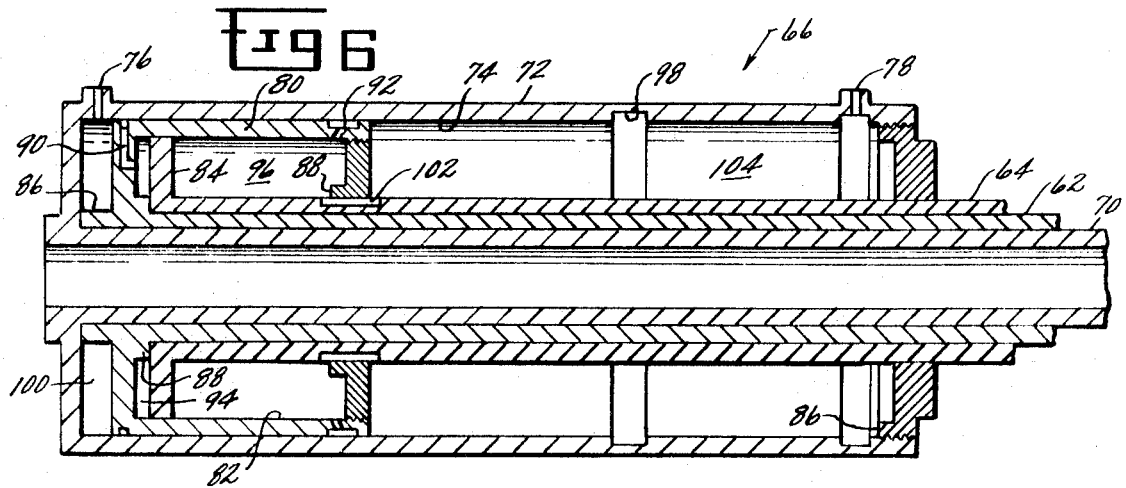
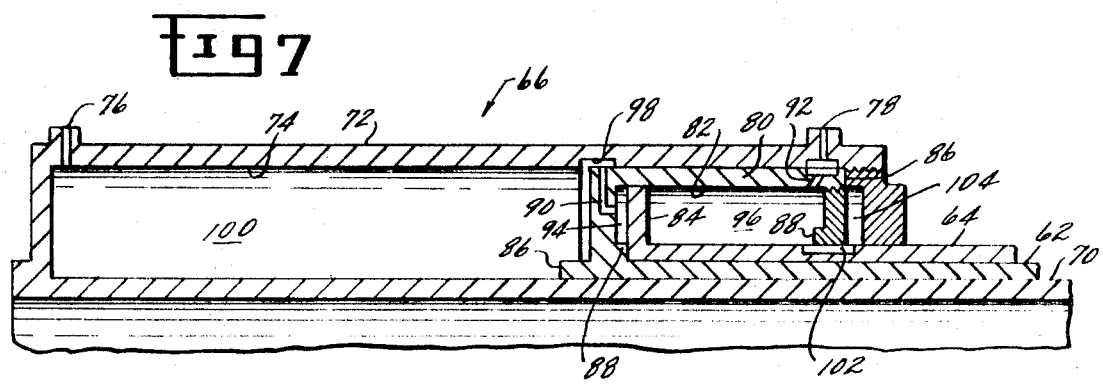
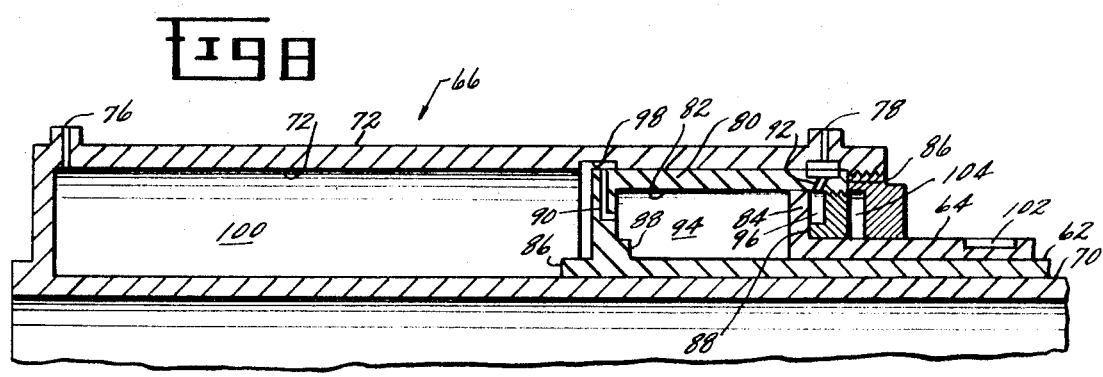

EXHAUST-GAS-FLOW-DIVERTING APPARATUS FOR A JET ENGINE

This invention is a continuation of application Ser. No. 780,327, filed Dec. 2, 1968 now abandoned.

This invention relates to gas turbine engines and, more particularly, to a device for spoiling or reversing the thrust normally produced by the flow of exhaust gases from gas turbine engines.

In aircraft gas turbine engines it is often necessary or desirable to provide means for reversing or at least spoiling the forward propulsive thrust normally produced by the flow of exhaust gases therefrom during aircraft landing. Of primary concern in the design of apparatus for reversing or spoiling such thrust are considerations such as reduced weight and size; minimum aerodynamic drag when such means are stowed or not in use; high reliability and efficiency of operation; and the ease and economy with which such apparatus may be produced.

This invention, then, is concerned with a novel thrust-reversing or spoiling apparatus which advantageously combines the above attributes.

A primary object of this invention, therefore, is to provide means for selectively diverting or changing the direction of the exhaust gases discharged from a jet engine to thereby reverse or spoil the thrust normally produced thereby.

Another object of this invention is to provide means as described above which has low storage drag characteristics, is of low weight and may be employed without increasing the overall engine dimensions.

A further object of this invention is to provide a device as above described which is reliable and of simplified and economical construction.

Yet another object of this invention is to provide a device which is movable between a retracted and stowed position housed in the nozzle plug or centerbody in substantially noninterfering relationship to the flow of exhaust gases and an extended and deployed position in flow-diverting relationship to the flow of exhaust gases.

A still further object is to provide an improved thrust-spoiling or reversing apparatus having flow-reversing cascades which may be stowed within the exhaust gas outlet centerbody and selectively deployed to a flow-diverting position across the flow of exhaust gases.

These and other objects, which will become apparent upon reading hereinafter, are achieved in the present invention by providing at least one cascade assembly which is movable between a stowed position, wherein said cascade is disposed generally axially and centrally of the outlet, and a deployed, thrust-reversing or spoiling position wherein the cascade assembly is disposed across a portion of the exhaust gas flow, together with means for covering the cascade assembly when in the stowed position so as to define a generally streamline centerbody for the exhaust gas outlet. Additionally, suitable means are provided to move the cascade assembly to and from its deployed position. Stated another way, fairing means are provided to cover the cascade assembly when in the stowed position together with means for uncovering the cascade assembly to enable movement thereof to the deployed position.

The cascade assembly is preferably hingeably connected to the engine or suitable engine structure for rotation between its stowed position and its deployed, thrust-reversing or spoiling position. The centerbody or central body may conclude a fixed upstream portion and a downstream portion which is movable between a position abutting the upstream portion, so as to cooperatively define the streamline central body and an axially spaced, extended position which enables movement of the cascade to and from its deployed position.

In one form, the cascade assembly is connected to the downstream body portion for axial translation therewith and means are provided in the upstream body portion for stowedly receiving at least a portion of the cascade assembly. Preferably, the apparatus includes two cascade assemblies which are deployed in a V-shaped arrangement downstream of the exhaust gas outlet of the engine.

While the specification concludes with claims particularly pointing out and distinctly claiming the subject matter of this invention, it is believed the invention will be better understood from the following description taken in connection with the accompanying drawings wherein:

FIG. 1 is a fragmentary side perspective view showing a jet engine employing an exemplary embodiment of the thrust-reversing or spoiling apparatus of the present invention;

FIG. 2 is a partial cross-sectional view showing the aft portion of the jet engine of FIG. 1 and the apparatus of this invention in its retracted and stowed position;

FIG. 3 is a partial cross-sectional view, like that of FIG. 2, showing the flow-diverting cascade assemblies in their uncovered, but stowed position;

FIG. 4 is a partial cross-sectional view, like that of FIG. 2, showing the flow-diverting cascade assemblies in their deployed, thrust-reversing or spoiling position;

FIG. 5 is a cross-sectional view taken along line 5–5 of FIG. 2;

FIG. 6 is a partial cross-sectional view, drawn to an enlarged scale, showing one form of the actuator means which may be employed by this invention, said means being shown in the retracted and stowed position;

FIG. 7 is a view, like that of FIG. 6, showing the actuator means of FIG. 6 in the extended and stowed position and FIG. 8 is a view, like that of FIG. 6, showing the actuator means of FIG. 6 in the extended and deployed position.

Referring now to FIG. 1, a jet engine has been shown at 10 suitably connected to an aircraft pylon 12 and having a front fan 14 housed within a suitable casing 16 and a core engine (not shown) housed within a suitable casing or nacelle 18. The casing 18 is sized smaller than and projects into the fan casing 16 so as to form an exhaust nozzle 20 therebetween for efflux of the fluid pressurized by the fan 14. As will be understood, the core engine (not shown) comprises a compressor, a combustor, and suitable turbomachinery adapted to drive both the compressor and the fan 14. A suitable nozzle or outlet 22 is provided at the downstream end of the core engine casing 18 for discharge of the exhaust gases produced by the combustor.

Although the invention has been depicted and will be described in connection with a jet engine of the type having a front fan 14, it will be understood that usage is not limited thereto.

In operation, as fan-pressurized fluid and exhaust gases generated by the combustor are discharged from nozzles 20 and 22, respectively, forward thrust is produced. To the end of reversing or at least spoiling the thrust normally produced by the flow of exhaust gases through nozzle 22, an apparatus, shown generally in its extended and deployed thrust-reversing or spoiling position at 24 in FIG. 1, is provided. As shown in FIG. 1, the apparatus preferably includes two fluid-diverting cascade assemblies 26 which are deployed in a V-shaped arrangement downstream of the exhaust gas outlet 22.

With reference now to FIGS. 2, 3 and 4, the exhaust gas outlet or nozzle 22 has been shown as being generally annular and cooperatively defined by the casing 18 and a central body, nozzle plug or centerbody 28 generally axially disposed within the casing 18. The central body 28 comprises a fixed upstream body portion 30 and a downstream body portion 32 adapted for axial translation between a retracted position, as shown in FIG. 2, and an extended position as shown in FIGS. 3 and 4.

Each cascade assembly 26 is provided with a plurality of axially spaced, fluid-directing or diverting vanes 34 and is hingeably connected at 36, adjacent its downstream end, to and for movement with the downstream body portion 32.

The cascade assemblies 26 have been shown in their retracted or covered and stowed position in FIG. 2, wherein each cascade assembly is housed within suitable receiving and covering means 38 formed in upstream body portion 30 and downstream body portion 32 is closely spaced to upstream body portion 30. The upstream and downstream body portions are provided with suitable fairing means, 40 and 42, respectively, adapted to abut and form a continuous, low drag, aerodynamically smooth external surface 44 which encloses the cascade assemblies 26.

As best shown in FIGS. 2 and 5, the cascade assemblies are formed with a central raised portion 46 and generally flat side portions 48 projecting therefrom which extend into close spaced relationship with opposed portions of the casing 18, sufficient clearance being left to enable free translation therebetween as will be hereinafter understood. As will be understood, the central raised portion 46 may be arcuate, as shown in FIG. 5, squared off or otherwise suitably formed to provide clearance for actuator rods 62, 64 which will be described herein after.

As shown in FIGS. 2 and 3, when in the stowed position, each cascade assembly is disposed generally axially and centrally of the casing 18.

While the cascade assemblies 26 and the axis of hinge connection 36 are preferably oriented in the vertical plane as shown to minimize the risk of disturbing foreign objects on the runway upon aircraft landing, it will be understood that they may be oriented otherwise.

As best shown in FIG. 5, the receiving means 38 include diametrically opposed, hollowed, strutlike members 50 extending radially outwardly from the upstream body portion 30 for housing the flat portion 48 of cascade assemblies 26. Preferably, each strutlike member 50 is joined to the casing 18, as shown in FIG. 5, so as to rigidize upstream portion 30 and efficiently transmit the force loadings experienced by the downstream plug portion 32 to the core engine casing 18 and, hence, to the aircraft pylon 12. It should be understood, however, that members 50 may terminate short of casing 18, their primary function in the depicted exemplary embodiment being to enclose the upstream end of the cascade assemblies so as to reduce drag or interference with the exhaust gas flow when the cascade assemblies are in their stowed and retracted position.

Means 52 are provided to move each cascade assembly, in unison, between its stowed and retracted or covered position of FIG. 2 and its deployed position of FIGS. 1 and 4, wherein each cascade assembly is disposed downstream of outlet 22 and across a portion of the exhaust gas flow path from outlet 22. In the deployed position, vanes 34 are operative to divert or redirect the exhaust gases and thereby spoil or reverse the thrust normally produce thereby. As will be understood, with the cascades in their deployed position, the vanes 34 may be adapted to turn and discharge the exhaust gases with a forward velocity component to thereby provide reverse thrust or to turn and discharge the exhaust gases with a diminished aft velocity component to thereby spoil the normal thrust.

In moving cascade assemblies 26 from their retracted and stowed position of FIG. 2 to their extended and deployed position of FIGS. 1 and 4, means 52 is preferably operable to first translate cascade assemblies 26 axially rearwardly to withdraw each cascade assembly 26 from receiving means 36 and then rotate, in unison, the free upstream end 54 of each cascade assembly radially outwardly about hinge connection 36. Likewise, in returning cascade assemblies 26 to their retracted and stowed position of FIG. 2, means 52 is preferably operable to first rotate each cascade, in unison, into its generally axially parallel stowed position and, then, translate the cascades into their retracted and stowed position.

It will be appreciated, however, that in its broader aspects the present invention is not limited to such sequential translational and rotational movement for moving the cascade assemblies from their stowed or covered position within fairing means 40, 42 to their deployed, thrust-reversing or spoiling position of FIGS. 1 and 4. For example, it will be understood that in accordance with the broader aspects of the present invention other suitable arrangements may be used to position the cascade assemblies 26 in their deployed position and provide a streamline cover therefor when in their stowed position.

As shown in FIG. 4, the cascade assemblies 26 are preferably disposed, in the extended and deployed position with their respective upstream free ends 54 adjacent opposed portions of the outlet end of casing 18 to form a wedge or v downstream of outlet 22 whereby most of the exhaust gases are acted upon and diverted by vanes 39.

As previously mentioned, the downstream body portion 32 preferably includes fairing means 42 which are adapted to abut and form a generally streamline continuation of the upstream body portion fairing 40. Depending upon the axial location of cascade hinge connection 36 and the angle through which each cascade assembly 26 must rotate in assuming the deployed, thrust-reversing or thrust-spoiling position, it may be necessary to provide means for moving the fairing means 42 in coordination with the rotation of cascade assemblies so as to prevent interference therebetween. For example, as shown in the drawings, the fairing means 42 may comprise a pair of arcuate fairing members 56, each respectively covering the downstream end of one cascade assembly 26 and hingeably connected to the downstream plug portion 32 at 58. Each fairing member may then be connected by suitable linkage means, as at 60, to its respective cascade assembly so that as the cascade assembly rotates, the fairing member 56 covering such cascade assembly also rotates about hinge connection 58 in a manner precluding interference therebetween.

While, as will be understood by those skilled in the art the means 52 may take many and varied forms such means have been depicted for exemplary purposes, as comprising axially disposed, telescoped, tubular actuator rods 62 and 64, actuator means 66 for moving the rods 62, 64 and linkage means 68 operatively connecting actuator rod 64 with each cascade assembly 26.

As shown in FIGS. 2, 3 and 4, the actuator rod 62 is slidably telescoped over and supported by a suitable axially disposed track or tube member 70 carried by the upstream body portion 30. The downstream body portion 32 is suitably secured to the downstream end of actuator rod 62 for movement therewith. Actuator rod 64, in turn, is slideably telescoped over and supported by rod 62 and is operatively connected at its downstream end to each cascade assembly 26 by linkage means 68 so that as rod 64 moves axially rearwardly relative to rod 62, cascade assemblies 26 are rotated radially outwardly in unison about hinge connection 36 and when rod 64 moves axially in the upstream direction relative to rod 62, cascade assemblies 26 are rotated toward their axially parallel stowed position.

Referring now to FIGS. 6 through 8, the actuator means 66 has been shown as being of the pneumatic or hydraulic type and comprising a cylinder body 72 defining an annular chamber 74 therein which extends concentrically around tube member 70. Fluid passages or ports 76 and 78 are formed adjacent each end of chamber 74 for venting and pressurized fluid delivery purposes. An annular piston 80, connected to the upstream end of rod 62 is disposed in chamber 74 and formed with an annular chamber 82 therein. An annular piston 84, connected to the upstream end of rod 64, is disposed within chamber 82. Suitable stop means 86 are provided to limit the movement of piston 80 within chamber 74 and thereby define the retracted and extended positions of rod 62, downstream body portion 32 and, hence, cascade assemblies 26. Likewise, stop means 88 are provided to limit the movement of piston 84 in chamber 82 and, hence, the relative movement of rod 64 with respect to rod 62.

Piston 80 is provided with passage 90 and 92, at its upstream and downstream ends, which communicate, respectively, with the upstream portion 94 and downstream portion 96 of chamber 82. As best shown in FIGS. 7 and 8, a recess 98 is provided in cylinder body 72 for communicating the upstream portion 100 of chamber 74 with passage 90 and, hence, chamber portion 94, when piston 80 is in abutment with downstream stop means 86. It will also be noted that passes 78 and 92 are arranged to communicate when piston 80 is in abutment with downstream stop means 86.

Rod 64 is provided with a recess 102 adapted to communicate chamber portion 96 with the downstream portion 104 of chamber 74 when piston 84 is in abutment with upstream stop means 88 as best shown in FIGS. 6 and 7.

While the actuator means 66 has been depicted and has and will hereinafter be described as being of the pneumatic or hydraulic type, it will be appreciated that suitable motorized means may be equally effectively employed to provide the required movement of rods 62 and 64. Further, it will be appreciated that both the actuator means 66 and the linkage means 68 may be varied from the construction shown to effect the sequential translational and rotational movement to cascade assemblies 26 in moving from the retracted and stowed position to the extended and deployed position.

The use, operation and function of the invention are as follows:

During normal aircraft flight, the apparatus of this invention is disposed as shown in FIG. 2 with the cascade assemblies substantially completely enclosed within the aerodynamically smooth confines a central body surface 44 to thereby minimize drag. With the apparatus in the position of FIG. 2, piston 80 and upstream stop means 86 abut the upstream end of chamber 74 and piston 84 abuts upstream stop means 88 as shown in FIG. 6.

To move the cascades to their thrust-reversing or spoiling deployed position of FIGS. 1 and 4, passage 78 is vented and passage 76 is communicated with a source of pressurized fluid. The pressurized fluid enters chamber portion 100 and urges piston 80 and, through upstream stop means 88, piston 84 downstream until piston 80 abuts downstream stop means 86 as shown in FIG. 7. Accordingly, rods 62 and 64 and, hence, downstream body portion 32 and cascades 26 are translated downstream to the extended and stowed position of FIG. 3. In moving from the position of FIG. 2 to the position of FIG. 3, the cascade assemblies are withdrawn from receiving means 38 and are axially positioned for proper rotation into their deployed position.

Referring again to FIG. 7, as piston 80 moves into abutment with downstream stop means 86, passage 90 and, hence, chamber portion 94 is placed on communication with the pressurized fluid in chamber portion 100 by recess 98. The pressurized fluid then, while maintaining piston 80 in abutment with downstream stop means 86, urges piston 84 to move in the downstream direction into abutment with downstream stop means 88. Such movement of piston 84 causes rod 64 to move downstream and, through linkage means 68, effects unison rotation of cascade assemblies 26 from their extended stowed position of FIG. 3 to their extended and deployed position of FIGS. 1 and 4.

To minimize the force which must be exerted by piston 84 to rotate the cascade assemblies to and from their deployed position, the turning vanes 34 are preferably formed and arranged so that aerodynamic forces acting thereon are vectored generally through the hinge connection 36.

To prevent interference between downstream body portion fairing members 56 and their respective cascade assemblies, linkage means 60 may be provided to rotate each fairing member 56 about its hinge connection 58 in unison with its respective cascade assembly.

With the cascade assemblies 26 positioned in their extended and deployed position, the exhaust gases flowing from outlet 22 are acted upon and diverted by the vanes 34 as shown in FIG. 4 to provide the desired thrust reversal or spoiling.

It should be noted that in moving piston 80 from its retracted position of FIG. 6 to its extended position of FIG. 7, and hence in moving the downstream plug portion 32 from its retracted position of FIG. 2 to its extended position of FIG. 3, fluid is expelled from the downstream portion 104 of chamber 74 through vented passage 78. In like manner, as piston 84 moves from its stowed position of FIG. 7 to its deployed position of FIG. 8, the fluid within the downstream 96 of chamber 82 is expelled through passage 92 and vented passage 78.

To move the cascades from their deployed position of FIG. 4 to their stowed position of FIG. 2, port 78 is communicated with a source of high-pressure fluid and port 76 is vented. The pressurized fluid flows through passage 92 into the downstream portion 96 of chamber 82 and urges piston 84 in the upstream direction thereby rotating the cascade assemblies 26, through means 68, to their stowed position of FIG. 3. As piston 84 moves in the upstream direction, fluid within upstream portion 96 of chamber 82 is vented to passage 76 through passage 90, recess 98 and upstream chamber portion 100. It should be noted that when the downstream portion 96 of chamber 82 is pressurized, such pressure not only urges piston 84 in the upstream direction but operates to maintain piston 80 in abutment with downstream stop means 86 so as to insure that downstream body portion 26 remains extended until the cascade assemblies 26 have been returned to their stowed position.

As piston 84 is moved into abutting contact with the upstream stop means 88, as shown in FIG. 7, thereby returning the cascade assemblies 26 to their stowed position of FIG. 3, the high-pressure fluid within chamber portion 96 is communicated, by recess 102, with downstream chamber portion 104, whereby pistons 80 and 84 are urged, in unison, toward the retracted position of FIGS. 2 and 6. Passage 78 is conveniently sized so that after piston 80 has moved slightly in the upstream direction but before passage 78 breaks communication with passage 92, communication is established between passage 78 and chamber portion 104 to thereby provide a continuous flow of high-pressure fluid to chamber portion 104. As pistons 80 and 84 move toward the retracted position of FIG. 6, the fluid within chamber portion 100 is vented by passage 76. It will be noted that during movement of piston 80 from the extended position of FIG. 7 to the retracted position of FIG. 6, the pressurized fluid continues to urge piston 84 into abutment with the upstream stop means 88 so as to insure that the cascade assemblies 26 are maintained in their stowed position while they are being retracted into recess means 38.

To prevent rotation of the downstream plug portion 32 and cascades 26, the track or tube member 64 may be provided with a suitable torque guide as at 106 in FIG. 5.

While one embodiment of actuator means 66 has been depicted and described, it will be understood that the actuator means 66 as well as the linkage means 68 responsive thereto may be widely varied, it being preferred in the depicted arrangement, however, that such means be operative to first translate the downstream body portion 32 axially rearwardly and then, sequentially, rotate each cascade assembly 26 from its stowed, generally axial position, into its deployed position of FIG. 4. Further, although a preferred embodiment of the invention has been shown as employing two cascade assemblies which are deployed as a wedge downstream of outlet 22, it should be understood that more or less than two cascades may be employed and that many other additions, alterations, and variations may be made without departing from the invention's fundamental theme.

What I claim is:

1. An apparatus for reversing or spoiling the thrust normally produced by the exhaust gases of a jet engine, said apparatus including, in combination:

an exhaust gas outlet cooperatively defined by an outer casing and a central body generally axially disposed within said casing, said central body including an upstream portion and a downstream portion carried by said upstream portion for axial translation between a retracted position adjacent said upstream portion and an extended position spaced from said upstream portion and downstream of said outlet, means for moving said second portion between said retracted position and said extended position, a cascade assembly hingeably connected to said second portion for axial movement therewith and for rotational movement between a generally axially disposed stowed position and a deployed position wherein said cascade assembly extends across a portion of the flow of exhaust gases, said cascade assembly having a plurality of fluid-directing vanes operative to divert the flow of exhaust gas, when in said deployed position, to at least spoil the thrust normally produced thereby, means for rotating said cascade assembly between said stowed position and said deployed position, and means formed in and carried by said first body portion for slideably receiving said cascade assembly in substantially noninterfering relationship with the flow of exhaust gas through said outlet when said cascade assembly and said downstream body portion are in, respectively, said stowed position and said retracted position.

2. The apparatus of claim 1 further characterized in that said rotating means is operative only when said upstream portion is in said extended position to thereby insure proper insertion and withdrawal of said cascade assembly into and from said receiving means.

3. The apparatus of claim 1 further characterized by and including first and second fairing means carried, respectively, by said upstream and said downstream portion, said fairing means adapted to abut and from a substantially continuous, aerodynamically smooth external surface for said central body when said downstream portion is in said retracted position.

4. The apparatus of claim 1 further characterized in that there are two cascade assemblies, said cascade assemblies being hinged to said downstream portion adjacent their downstream ends for oppositely directed, unison rotation to and from said deployed position, each said cascade assembly having a raised central portion and generally flat side portions extending oppositely therefrom into close spaced relationship with opposed portions of said casing when said cascade is stowed and retracted, said receiving means including diametrically opposed struts extending between said upstream portion and said casing.

5. The apparatus of claim 4 further characterized in that said cascade assemblies are disposed with their free ends adjacent opposed portions of the downstream end of said casing when said downstream portion and said cascades are, respectively, in said extended and said deployed position.

6. The apparatus of claim 4 further characterized by and including first and second fairing means carried, respectively, by said upstream and said downstream portions, said fairing means adapted to abut and from a substantially continuous, aerodynamically smooth external surface for said central body when said downstream portion is in said retracted position, said second fairing means including a fairing member for each said cascade assembly, each said fairing member hingeably connected at its downstream end to said downstream portion and disposed with its upstream end in covering relationship to the downstream end of its respective cascade assembly, and linkage means for rotating each said fairing member about its hinge connection in unison with the rotation of its respective cascade assembly to preclude interference therebetween.

7. An apparatus for reversing or spoiling the thrust normally produced by the exhaust gases of a jet engine, said apparatus including, in combination:

an exhaust gas outlet cooperatively defined by an outer casing and a central body generally axially disposed within said casing, said central body having an upstream portion fixedly carried by said casing and a movable downstream portion, at least one cascade assembly hingeably connected to said downstream body portion for movement therewith, each said cascade assembly having a plurality of spaced fluid-directing vanes, means for receiving and covering each said cascade assembly in substantially noninterfering relationship with the flow of exhaust gases through said outlet, and means for moving each said cascade assembly between a first position, wherein each said cascade assembly is housed within said receiving and covering means, and a deployed position, wherein each said cascade assembly extends across a portion of the flow of exhaust gases from said outlet whereby said exhaust gases are diverted by said vanes to at least spoil the thrust normally produced thereby.

8. The apparatus of claim 7 further characterized in that said hinge connection is adjacent the downstream end of each said cascade assembly, each said cascade assembly being disposed generally parallel to the axis of said outlet when in said first position.

9. The apparatus of claim 7 further characterized in that said moving means is operative, in moving each said cascade assembly from said first position to said second position, to sequentially first translate each cascade assembly axially rearwardly to an extended position wherein each cascade is withdrawn from said receiving and covering means and then rotate, in unison, each cascade assembly about said hinge connection into said second position.

10. The apparatus of claim 9 further characterized in that said moving means comprises:

an axially disposed track carried by said upstream body portion, a first axially extending rod slideably carried by said track and secured at its downstream end to said downstream body portion, a second axially extending rod slideably carried by said track, actuator means for moving said rods, in unison, between said retracted position and said extended position and for further moving said second rod, relative to said first rod, between said extended position and a deployed position downstream thereof, and linkage means operatively connecting said second rod with each said cascade assembly for rotating each said cascade when said second rod is moved between said extended and deployed positions.

11. The apparatus of claim 10 further characterized in that said track and said first and second rods are generally tubular, said first and second rods being telescoped over said track, said actuator means comprising a fluid cylinder carried by said upstream body portion and defining an annular chamber generally coaxially with said track, a first annular piston disposed in said first chamber for fore-aft axial movement in response to fluid pressure in said first chamber, said first piston secured to the upstream end of said first rod and defining a second annular chamber therein generally coaxially with said first chamber, a second annular piston disposed in said second chamber for fore-aft axial movement response to to fluid pressure in said second chamber, said second piston secured to the upstream end of said second rod, and means for delivery of a pressurized fluid into said first and second chamber to effect said sequential unison and relative movement of said first rod and said second rod.

12. The apparatus of claim 7 further characterized by and including first and second fairing means carried, respectively, by said upstream body portion and said downstream body portion, said first and second airing mans adapted to abut and from a generally streamline, aerodynamically smooth external surface for said central body when said cascades are in said first position.

13. The apparatus of claim 12 further characterized in that said second fairing means includes a fairing member for each said cascade assembly, each said fairing member hingeably connected at its downstream end to said downstream body portion and disposed with its upstream end in covering relationship to the downstream end of its respective cascade assembly, and linkage means responsive to said moving means for rotating each said fairing member radially outwardly about its hinge connection when its respective cascade assembly is moved to said second position to prevent interference therebetween.

14. In a jet engine of the type adapted to produce a forward propulsive thrust by exhausting a gas flow through an outlet defined internally of a hollow outer casing, improved apparatus for selectively reversing or spoiling said forward propulsive thrust, said apparatus comprising:

at least one cascade assembly carried by said jet engine and movable between a stowed position, wherein said cascade assembly is disposed generally axially of said outer casing, and a deployed position, wherein said cascade assembly extends across at least a portion of the exhaust gas flow, said cascade assembly having a plurality of fluid-directing vanes operative to divert the flow of exhaust gas to at least spoil the forward propulsive thrust when said cascade assembly is in said deployed position, means for moving said cascade assembly between said stowed and deployed positions, and fairing means for defining a generally streamline cover for said cascade assembly when the latter is in said stowed position.

15. The improved apparatus of claim 14 further characterized by the including two cascade assemblies.

16. The improved apparatus of claim 15 further characterized in that said cascade assemblies are hingeably connected to said engine adjacent their downstream ends, said fairing means including an upstream portion and a movable downstream portion, said cascade assembly moving means being operative to translate said downstream fairing portion to an extended position enabling rotation of said cascade assemblies to and from said deployed position.

17. The improved apparatus of claim 16 further characterized in that said upstream fairing portion includes diametrically opposed struts joining said outer casing.

18. An apparatus for reversing or spoiling the forward propulsive thrust normally produced by the exhaust gases of a jet engine, said apparatus including, in combination:

an exhaust gas outlet cooperatively defined by and between an outer casing and a central body, fairing means carried by said central body portion for defining a generally smooth outer surface for said central body portion, at least one cascade assembly having a plurality of fluid-directing vanes, and means for moving said cascade assembly between a stowed position, wherein said cascade assembly is housed within said fairing means in substantially noninterfering relationship with the flow of exhaust gas through said outlet, and a deployed position wherein said cascade assembly extends across at least a portion of said exhaust gas outlet and said vanes are operative to divert the flow of exhaust gas and at least spoil the forward propulsive thrust normally produced by said gas flow.

PO-1050
(5/69)

UNITED STATES PATENT OFFICE
CERTIFICATE OF CORRECTION

Patent No. 3,589,617        Dated June 29, 1971

Inventor(s)        Arthur P. Adamson

It is certified that error appears in the above-identified patent and that said Letters Patent are hereby corrected as shown below:

Column 8, line 49, after the word "movement" insert the word --in--;

Column 8, line 49, after the words "response to" delete the word "to" and insert the word --the-- in place thereof;

Column 8, line 59, after the word "second" delete the words "airing mans" and insert the words --fairing means-- in place thereof;

Column 8, line 60, delete the first word "from" and insert the word --form-- in place thereof; and Column 9, line 19, delete the word "the" and insert the word --and-- in place thereof.

Signed and sealed this 28th day of December 1971.

(SEAL)
Attest:

EDWARD M. FLETCHER, JR.       ROBERT GOTTSCHALK
Attesting Officer             Acting Commissioner of Patents